(12) United States Patent
Guedes et al.

(10) Patent No.: US 8,793,040 B2
(45) Date of Patent: Jul. 29, 2014

(54) CLIMB-OPTIMIZED AUTO TAKEOFF SYSTEM

(75) Inventors: Patrice London Guedes, Sao Paulo (BR); Ricardo Wallach, Sao Jose dos Campos (BR); Guilherme Maximiliano Verhalen, Sao Paulo (BR); Salvador Jorge da Cunha Ronconi, Sao Jose dos Campos (BR)

(73) Assignee: Embraer S.A., Sao Jose dos Campos-SP (BR)

( * ) Notice: Subject to any disclaimer, the term of this patent is extended or adjusted under 35 U.S.C. 154(b) by 0 days.

(21) Appl. No.: 13/158,123

(22) Filed: Jun. 10, 2011

(65) Prior Publication Data

US 2012/0316706 A1 Dec. 13, 2012

(51) Int. Cl.
*G05D 1/06* (2006.01)
*G05D 1/12* (2006.01)
*G06G 7/70* (2006.01)
*G05D 1/08* (2006.01)

(52) U.S. Cl.
CPC ............ *G05D 1/0661* (2013.01); *G05D 1/0833* (2013.01)
USPC ..................................... 701/15; 701/4; 701/5

(58) Field of Classification Search
USPC .............. 701/3, 4, 5, 6, 7, 8, 9, 15; 244/75.1, 244/181, 182, 183
See application file for complete search history.

(56) References Cited

U.S. PATENT DOCUMENTS

| | | | | |
|---|---|---|---|---|
| 3,681,580 | A * | 8/1972 | Gwathmey et al. | 701/6 |
| 3,822,047 | A * | 7/1974 | Schuldt, Jr. | 244/181 |
| 3,945,590 | A * | 3/1976 | Kennedy et al. | 244/181 |
| 5,527,002 | A * | 6/1996 | Bilange et al. | 244/181 |
| 6,422,517 | B1 * | 7/2002 | DeWitt et al. | 244/181 |
| 6,546,317 | B2 * | 4/2003 | Bousquet | 701/15 |
| 6,643,568 | B2 * | 11/2003 | Chatrenet et al. | 701/15 |
| 7,281,683 | B2 * | 10/2007 | Delaplace et al. | 244/75.1 |
| 2005/0230564 | A1 * | 10/2005 | Yamane | 244/183 |
| 2005/0242235 | A1 * | 11/2005 | Delaplace et al. | 244/75.1 |
| 2008/0135688 | A1 * | 6/2008 | Villaume et al. | 701/5 |
| 2009/0171518 | A1 * | 7/2009 | Yamane | 701/15 |
| 2010/0028150 | A1 * | 2/2010 | Lawson | 416/141 |
| 2011/0040431 | A1 * | 2/2011 | Griffith et al. | 701/15 |
| 2011/0121140 | A1 * | 5/2011 | Yamane et al. | 244/183 |

OTHER PUBLICATIONS

D. H. Perry, The Airborne Path During Take-off for Constant Rate-of-Pitch Manoeuvres, 1969, Her Majesty's Stationary Office, C.P. No. 1042 SBN 11 470169 5, pp. 6-10, 13-18, 20.*

\* cited by examiner

*Primary Examiner* — Helal A Algahaim
*Assistant Examiner* — Dale W Hilgendorf
(74) *Attorney, Agent, or Firm* — Nixon & Vanderhye P.C.

(57) ABSTRACT

The Climb-Optimized Takeoff System is an aircraft functionality aimed at improving the takeoff performance. The improvement is obtained by allowing the airplane to rotate to an optimized pitch attitude at and after VR, while ensuring that the minimum required takeoff climb gradients and the geometric limitations of the airplane are being respected. The optimum takeoff performance is obtained by granting that the airplane pitch attitude, instead of being limited by a single takeoff constraint (such as a given pitch to avoid tail strike) is being tracked to its instantaneous, most constraining limit during the air transition phase (d2).

7 Claims, 12 Drawing Sheets

Increase in air transition distance due to non-optimized pitch

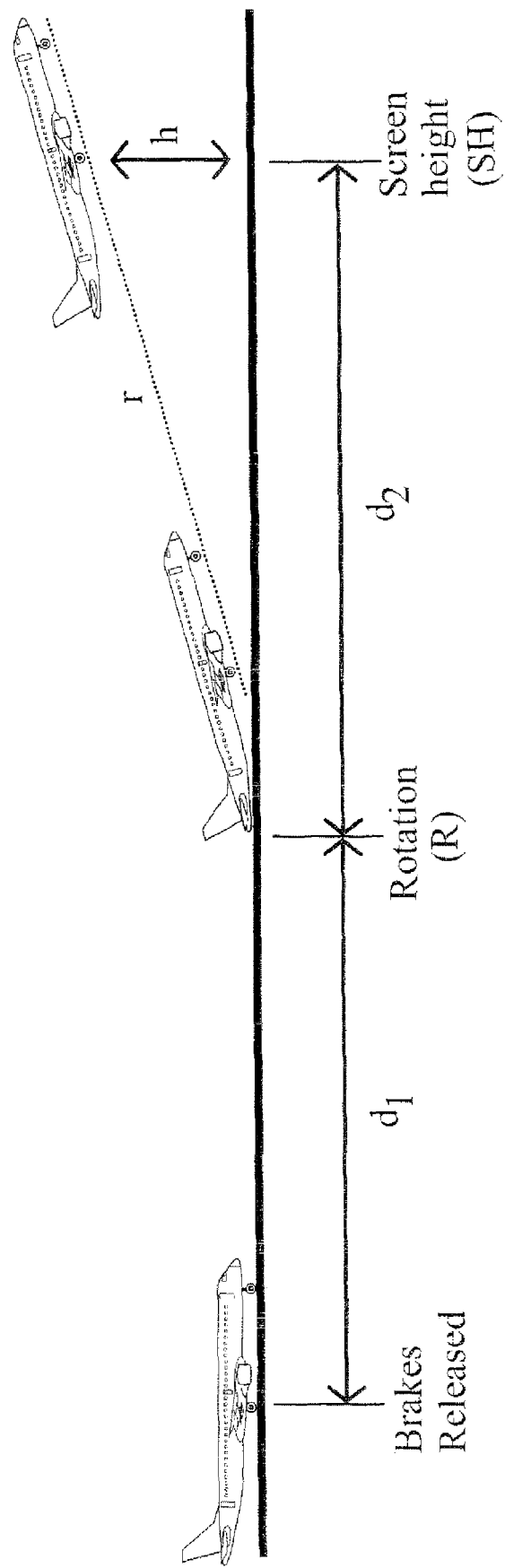
FIG. 1: Takeoff segments definition

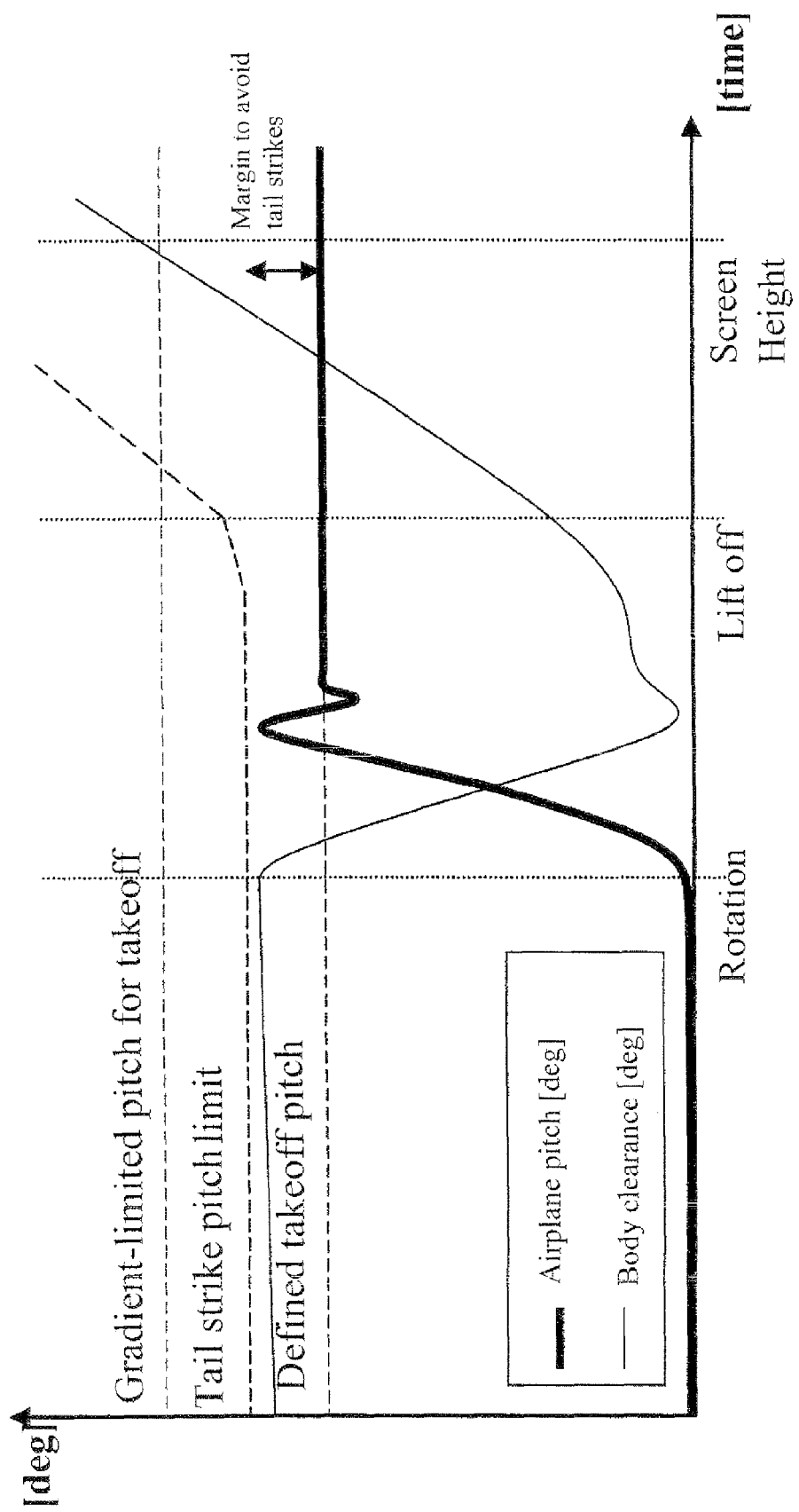
FIG. 2: Pitch and clearance time history for a geometrically-limited airplane

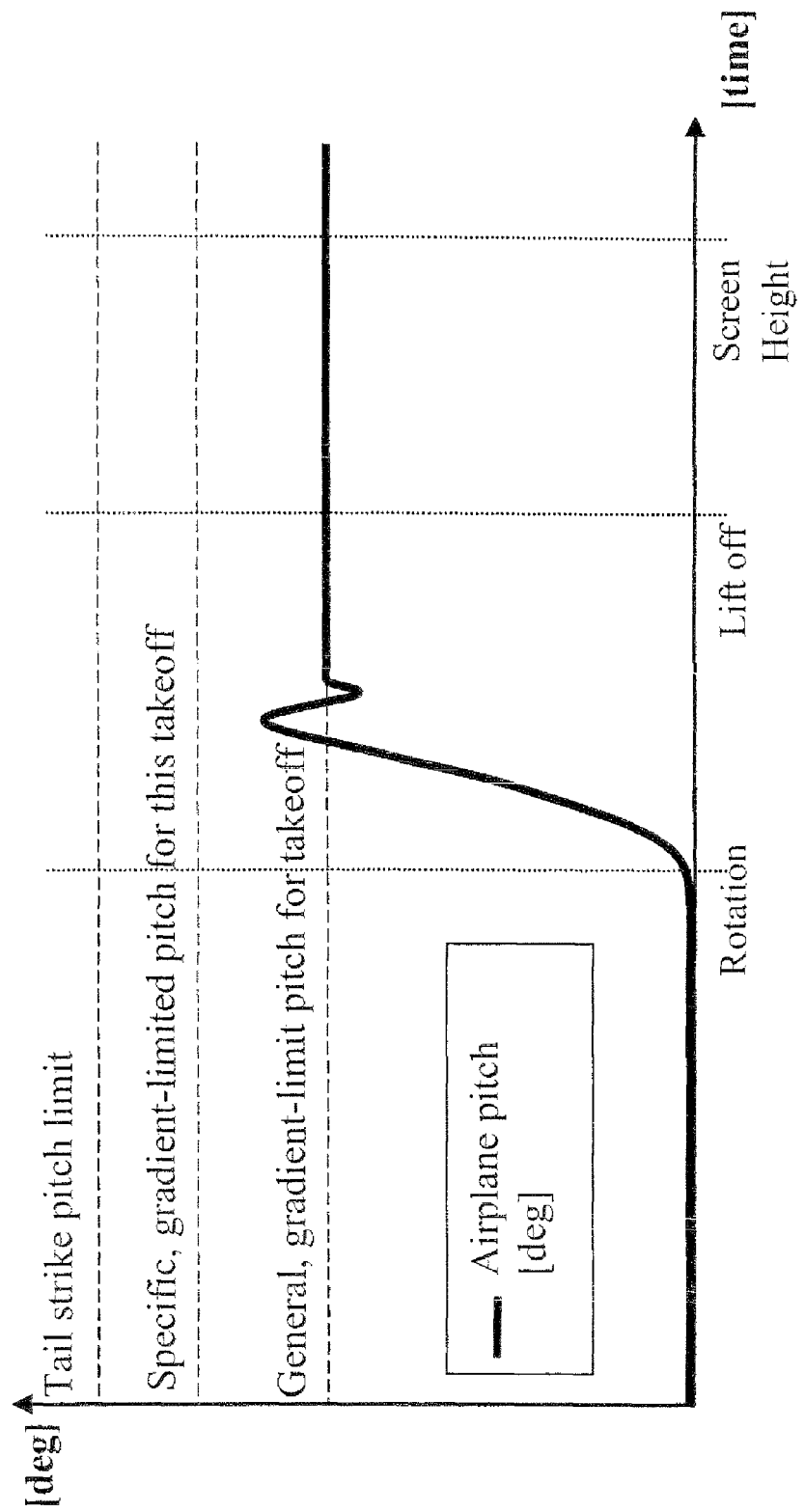
FIG. 3: Pitch and clearance time history for a non geometrically-limited airplane

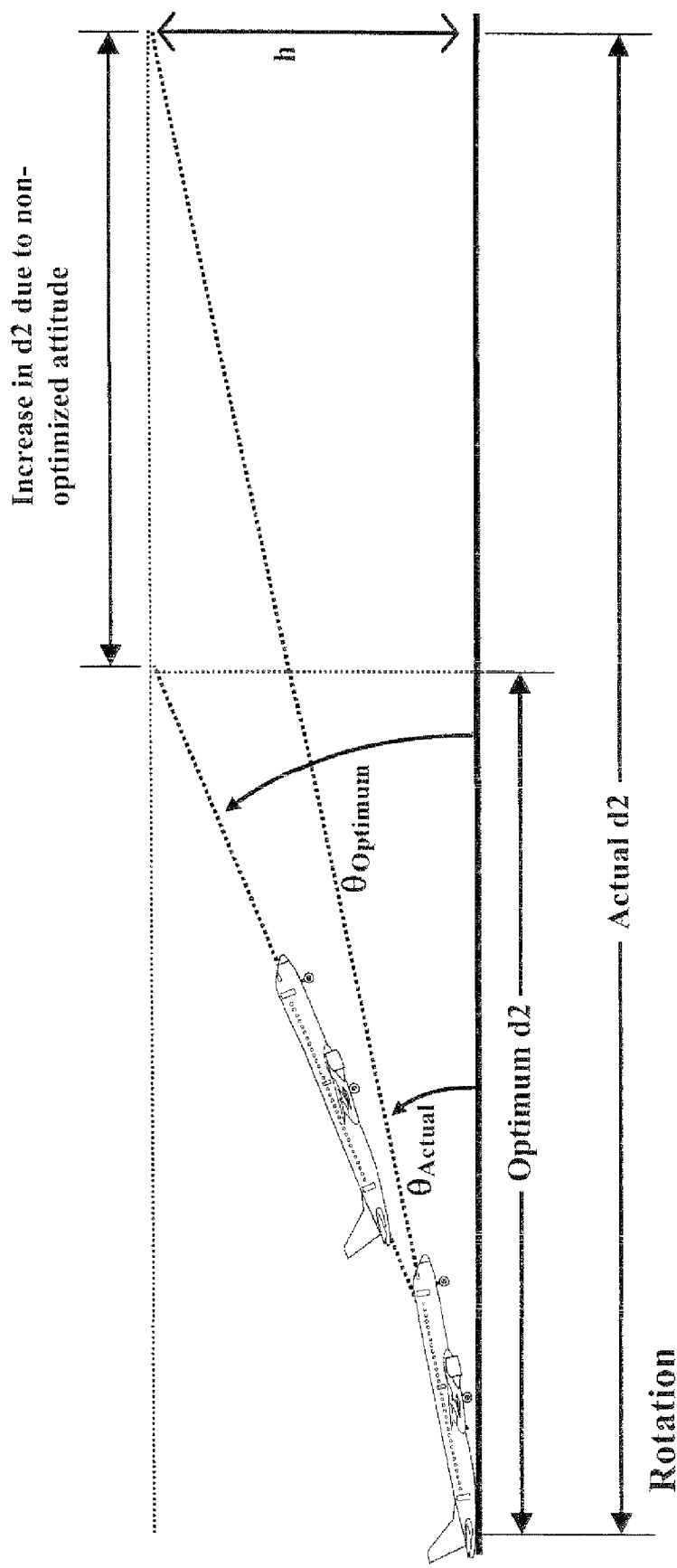
FIG. 4: Increase in air transition distance due to non-optimized pitch

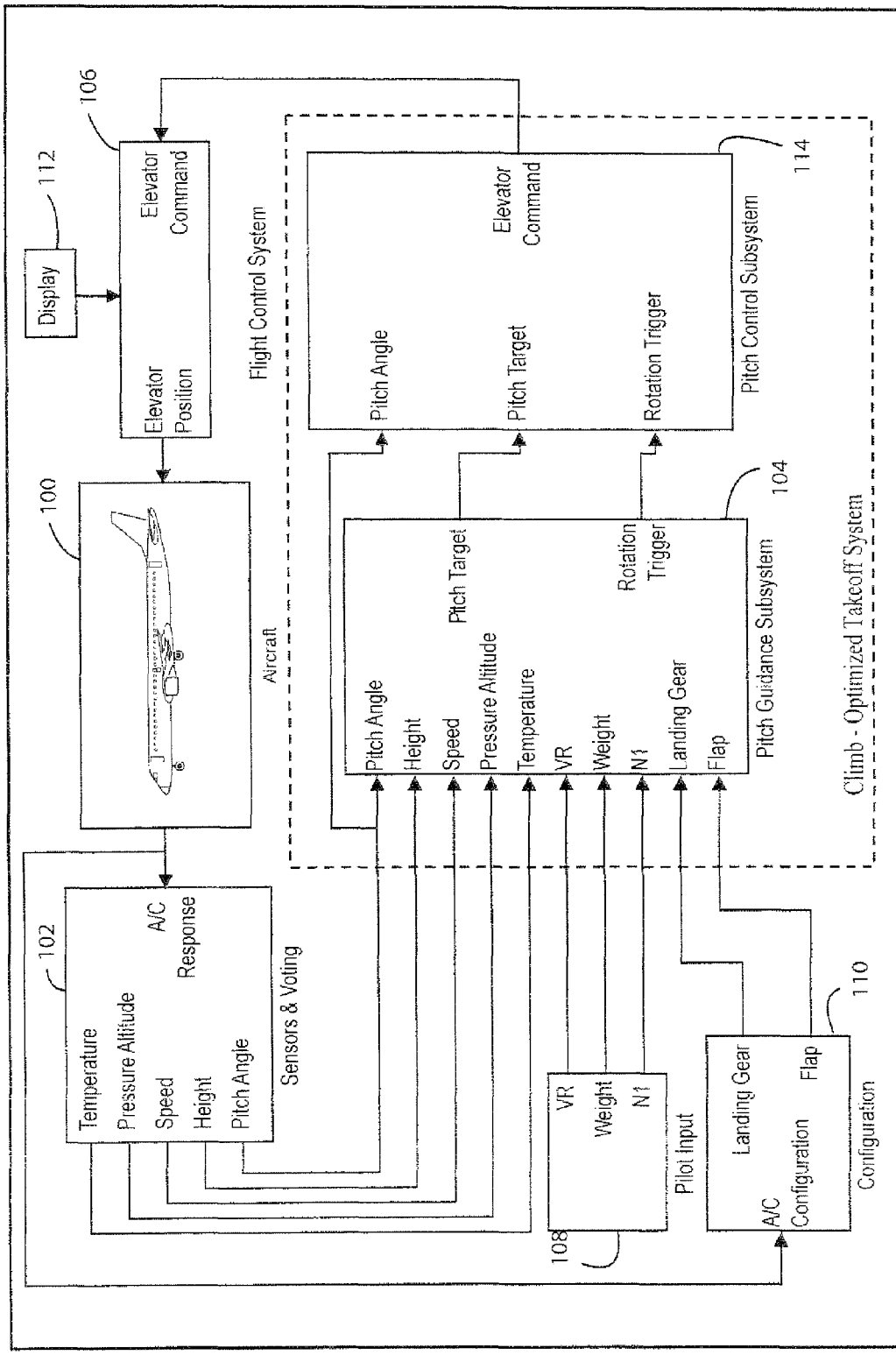
FIG. 5: Example Auto Takeoff (Climb-Optimized Takeoff) System Diagram

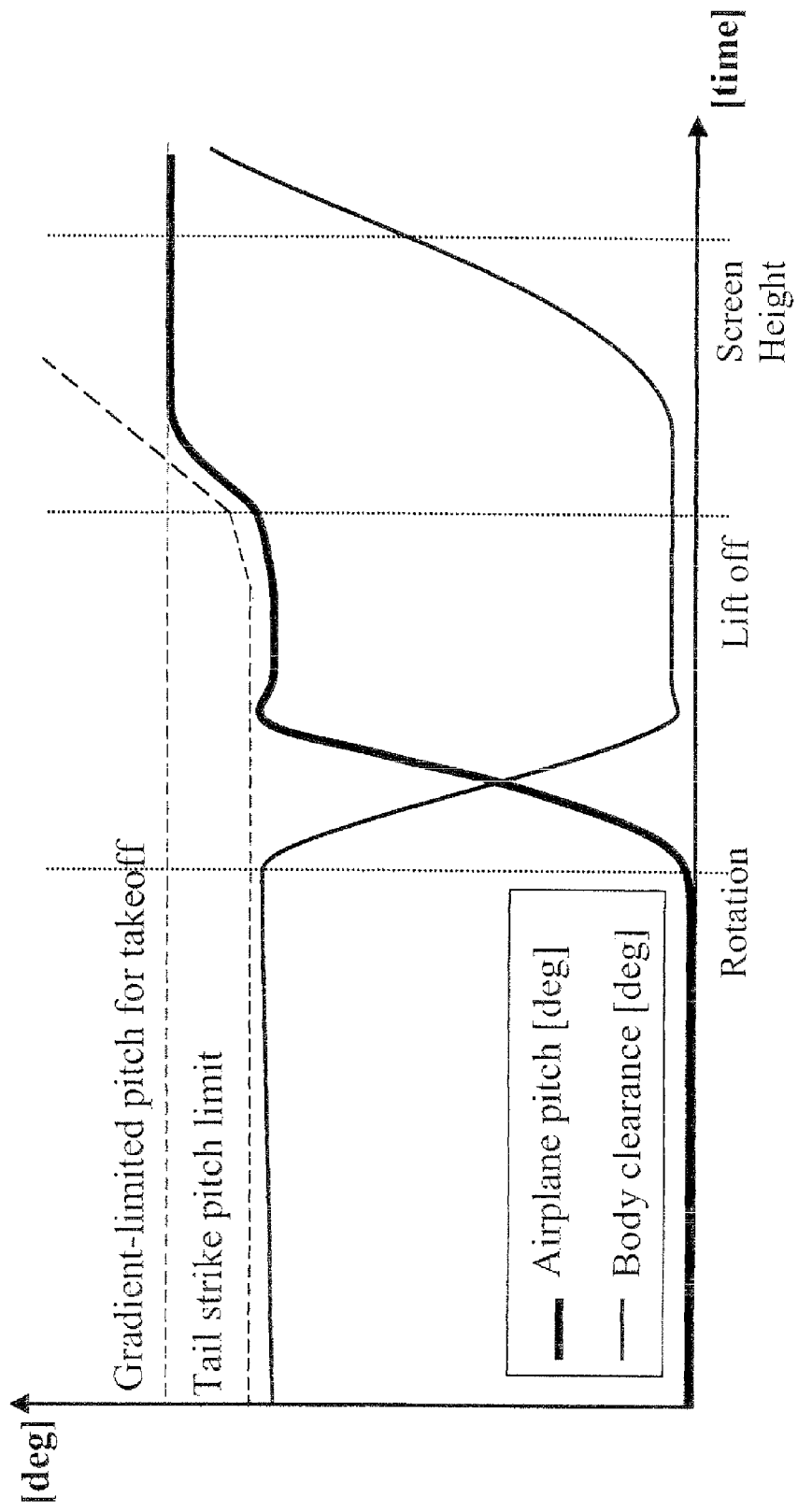
FIG. 5A: Pitch and clearance time history for an optimized takeoff performance

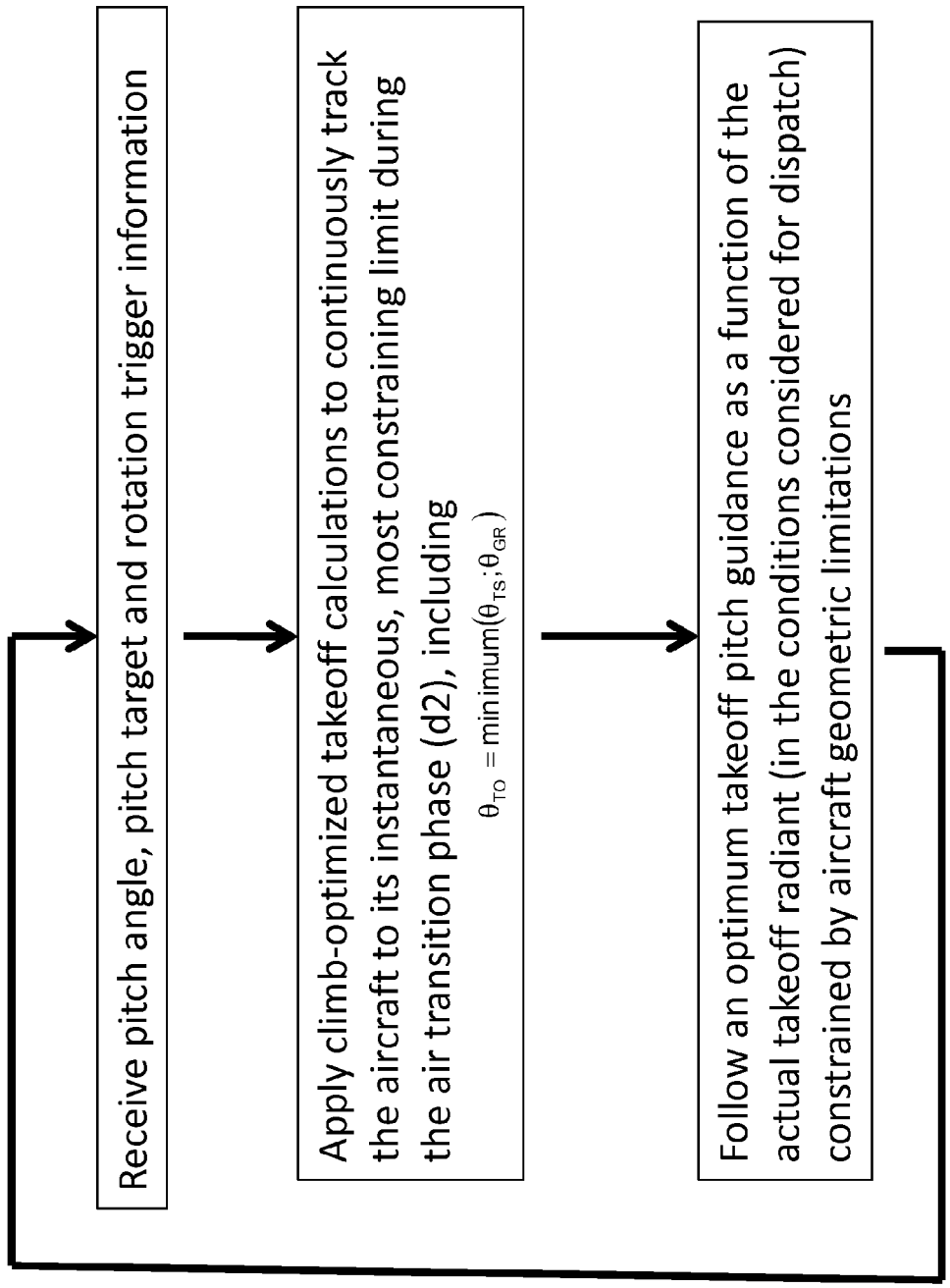
Fig. 5-B

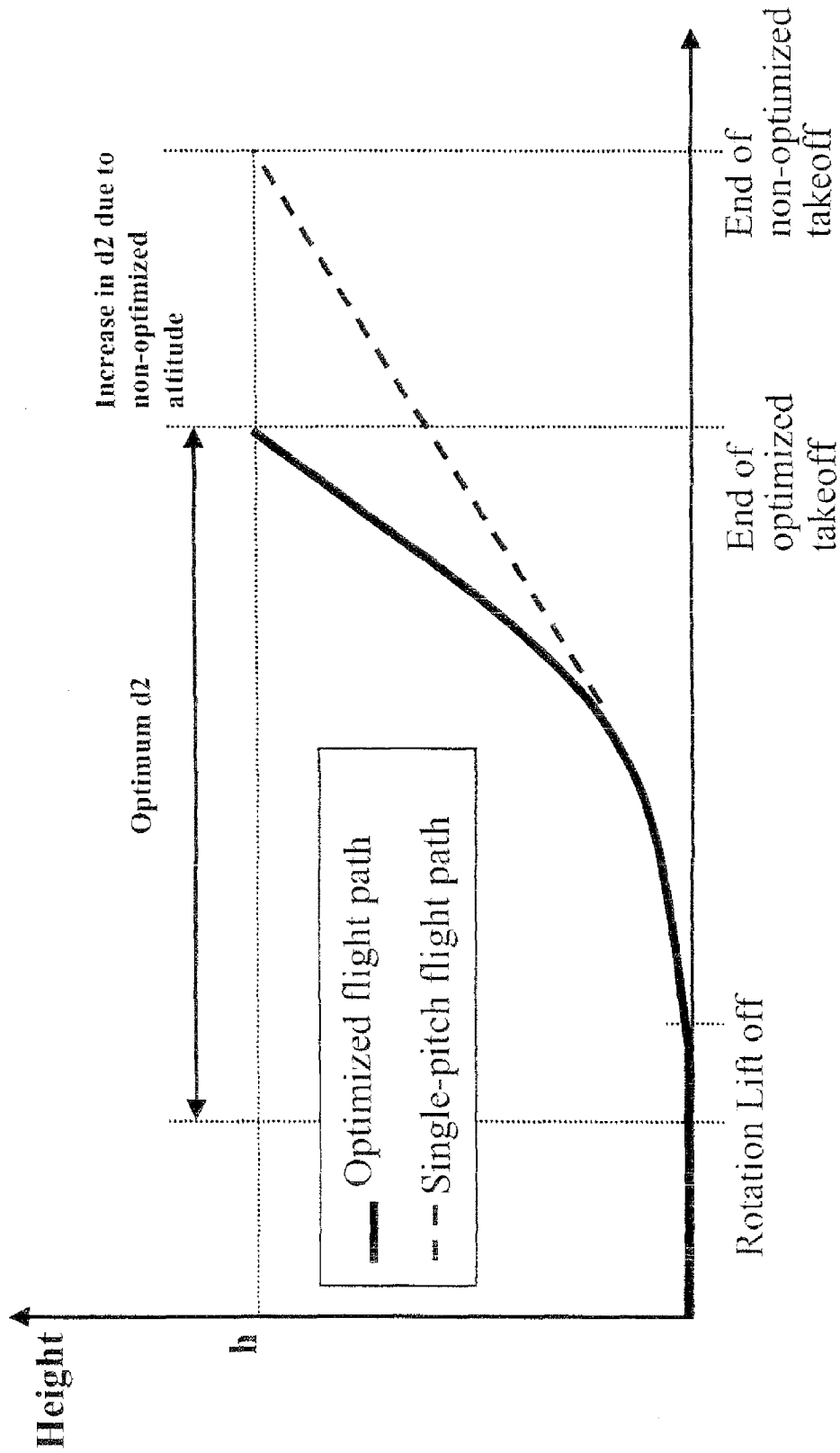
FIG. 6 : Pitch and clearance time history for a non geometrically-limited airplane

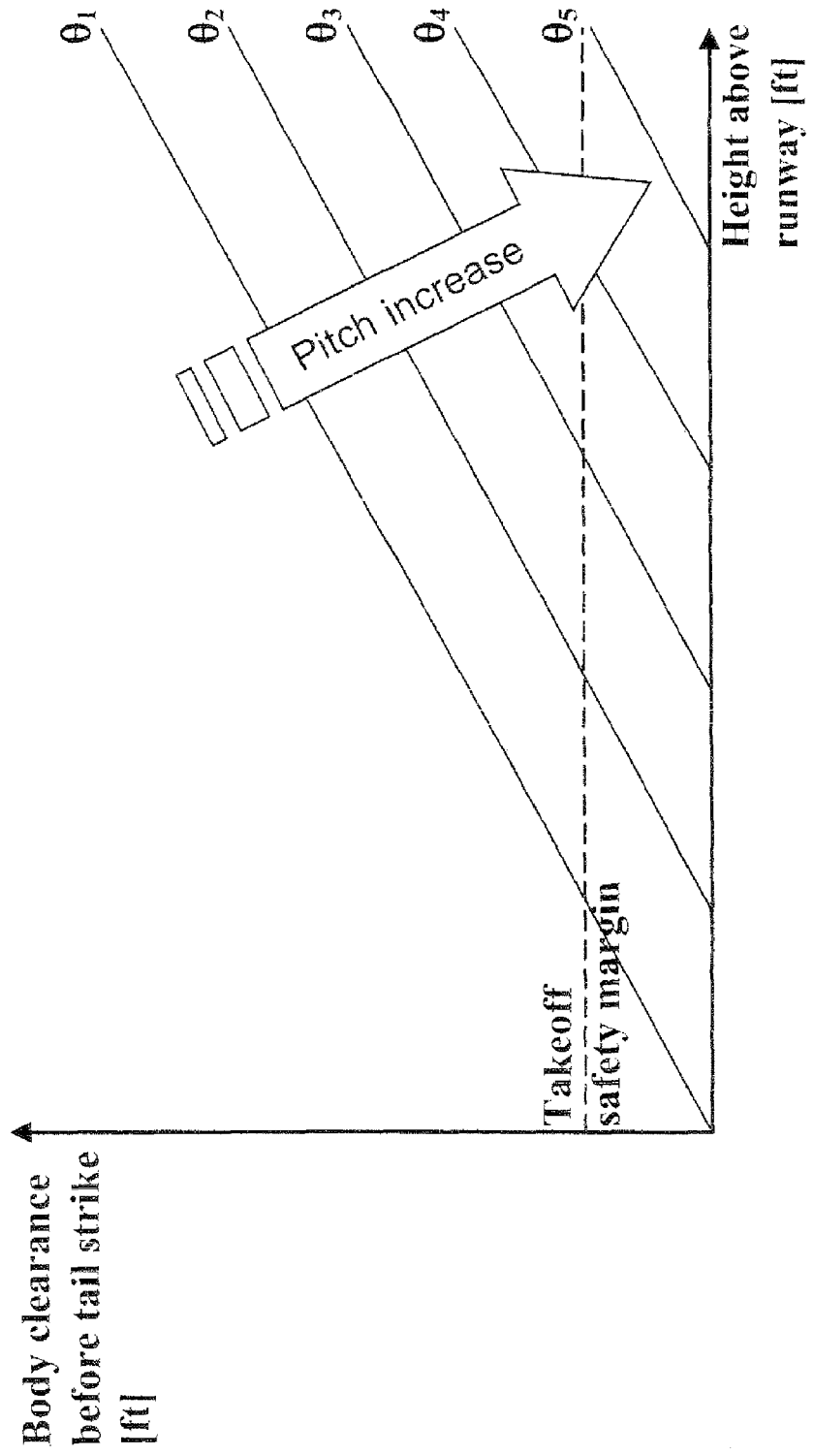
FIG. 7: Body clearance as a function of takeoff pitch angle and height above the runway

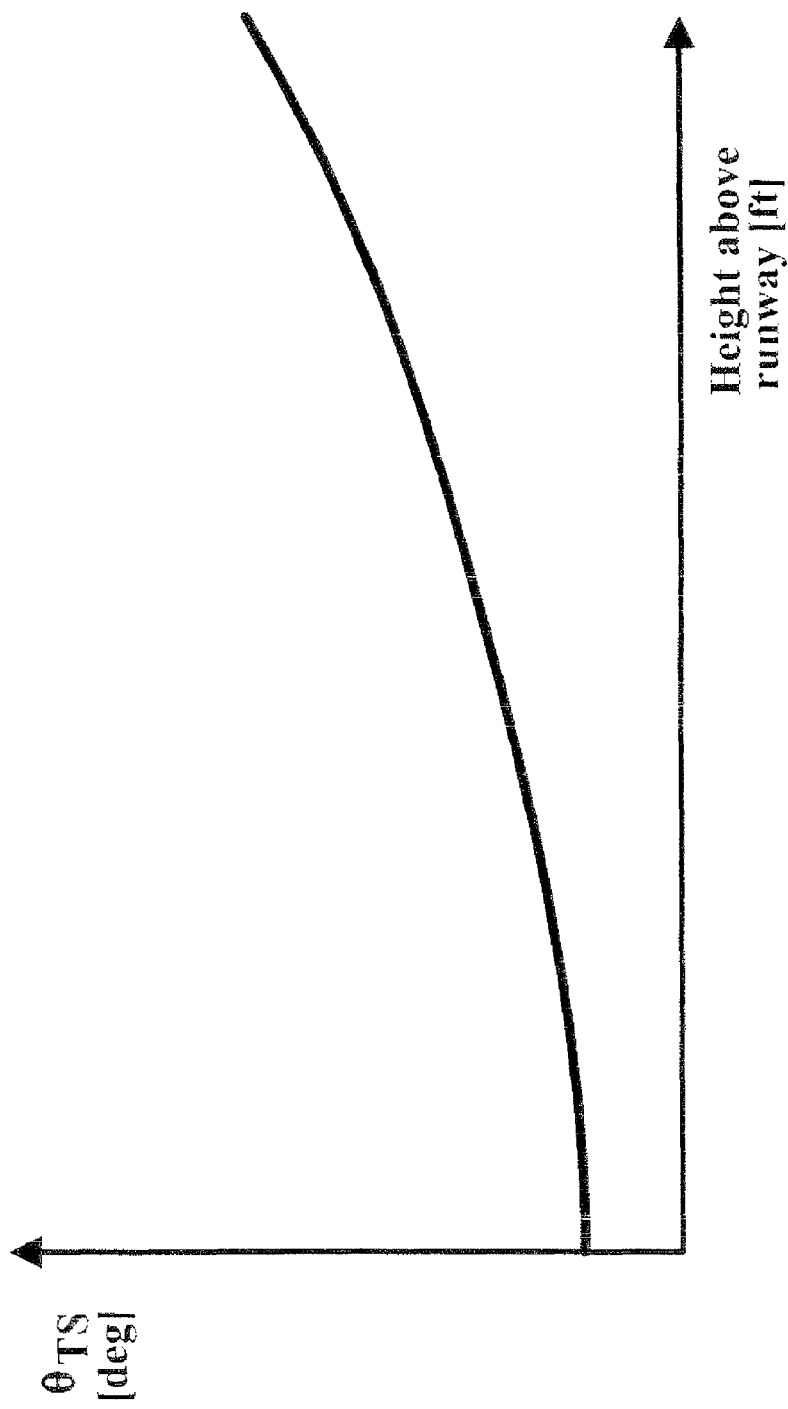
FIG. 8: Tail strike safe takeoff pitch angle as a function of airplane height above runway

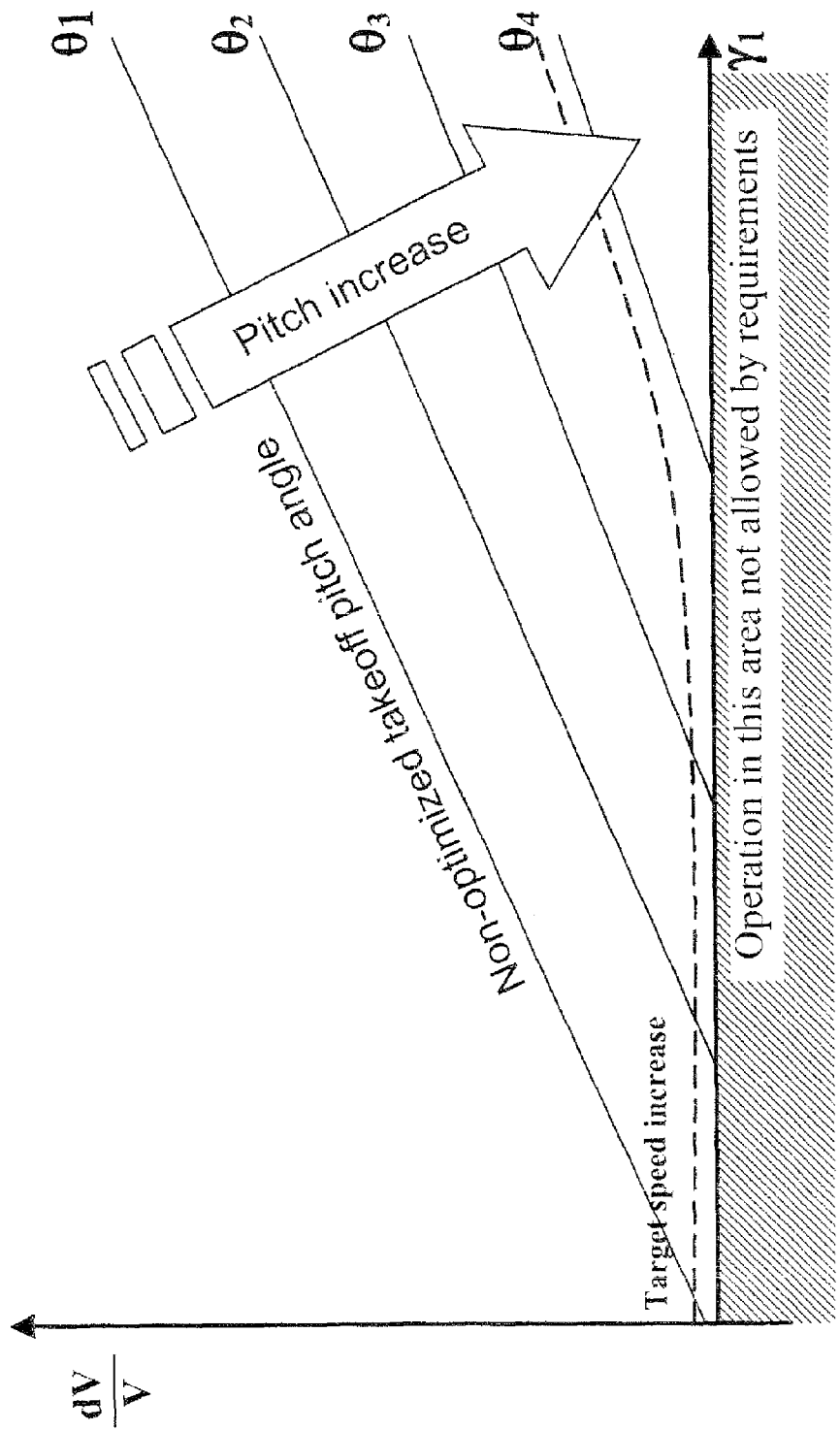
FIG. 9 : Speed increase ratio as a function of first segment gradient and takeoff pitch angle

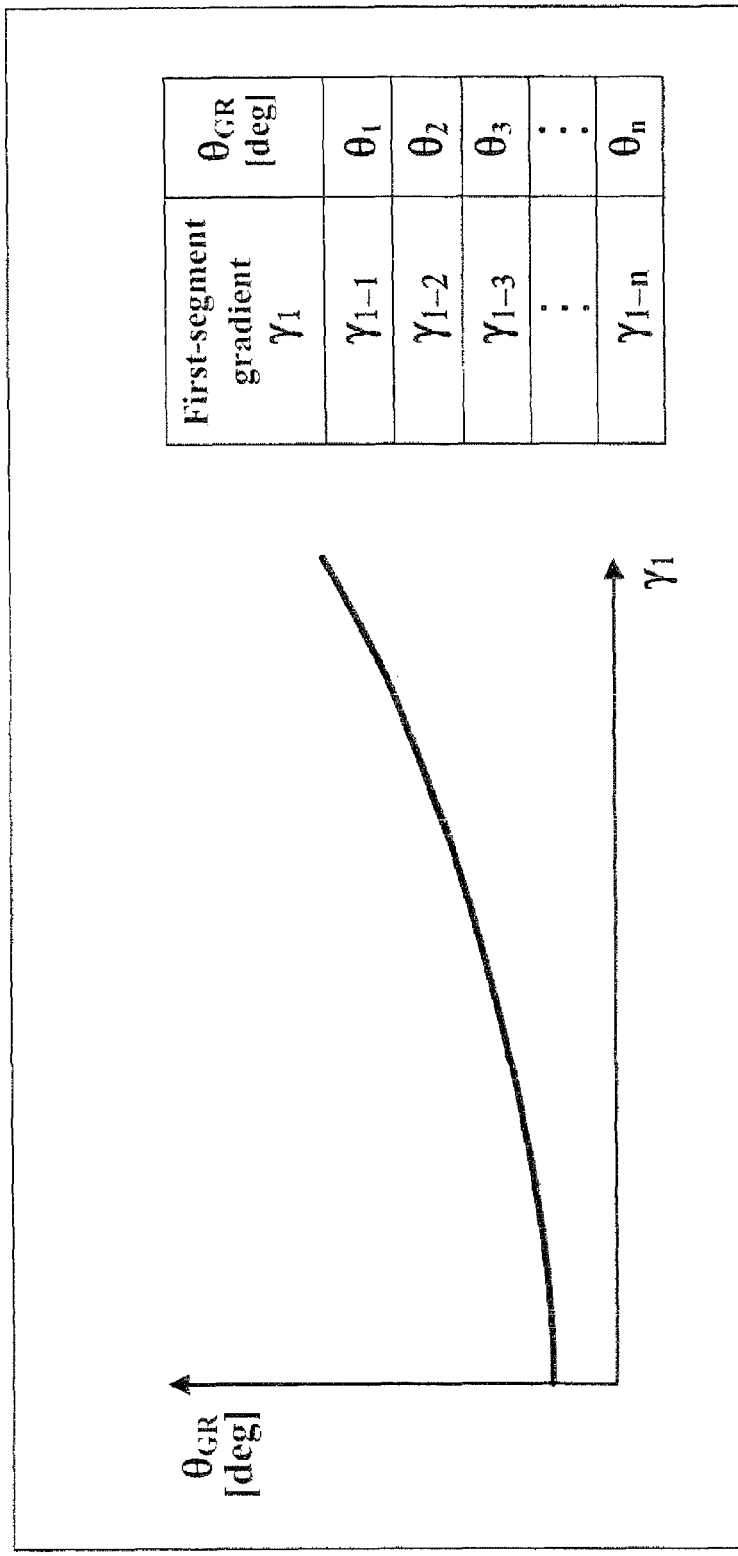
FIG. 10: Tail strike safe takeoff pitch angle as a function of airplane height above runway

CLIMB-OPTIMIZED AUTO TAKEOFF SYSTEM

CROSS-REFERENCES TO RELATED APPLICATIONS

N/A

STATEMENT REGARDING FEDERALLY SPONSORED RESEARCH OR DEVELOPMENT

N/A

FIELD

The technology herein relates to performance/automatic flight control systems.

BACKGROUND AND SUMMARY

Anyone who has ridden in airplane knows the thrill of taking off from the runway. When the airplane is cleared for takeoff, the pilot releases the brakes and controls the engines to increase thrust. The airplane begins moving down the runway faster and faster. When the airplane is moving fast enough so that the amount of lift generated by the wings permits safe takeoff, the pilot controls the plane's flight control surfaces (e.g., the elevator) to cause the nose of the airplane to rotate skyward. The airplane leaves the ground with its nose pitched upwards. Depending upon the particular aircraft configuration, weight, weather and other factors, the plane gains altitude at different rates as it ascends to a desired altitude for level flight.

Certain aircraft performance speeds known as "v-speeds" change based on operating conditions. One of the "v-speeds" is $V_R$—also known as takeoff rotation speed. $V_R$ is the speed at which aircraft takeoff rotation is initiated by the pilot. $V_R$ is always greater than another v-speed ($V_{MCA}$) which is the minimum speed which provides directional control in the air during engine failure. V-speeds can be affected by a variety of factors including gross takeoff weight, air pressure, temperature, aircraft configuration and runway conditions.

Aircraft takeoff distance is classically divided in two segments: ground acceleration (d1) and air transition (d2). See FIG. 1.

Ground acceleration distance d1 is measured from when the brakes are released to the beginning of rotation at $V_R$. Air transition distance d2 is measured from that point to the point d1 where the aircraft reaches a specified height (h) above the runway.

Usually the length of segment d1 is calculated by mathematically integrating movement equations reflecting the engines thrust, airplane lift, drag and weight in given atmospheric conditions.

For segment d2, based on the energy conservation principle, the following equation can be derived:

$$\boxed{\frac{1}{2}mV_R^2}_1 + \boxed{\int_r (\vec{T}-\vec{D})\cdot d\vec{r}}_2 = \boxed{\frac{1}{2}mV_{SH}^2}_3 + \boxed{mgh}_4 \quad [1]$$

where:

Expression 1: kinetic energy of the airplane at beginning of rotation

Expression 2: total energy increase due to the engines thrust along the flight path Expression 3: kinetic energy of the airplane at the end of air transition Expression 4: potential gravitational energy at the end of air transition.

For simplification and better understanding, consider the case of a given takeoff from a level runway. In this case, the values of m, g, $V_R$ and h are previously known. As a consequence, expressions 1 and 4 are also predetermined. Therefore, the larger expression 3 becomes, the larger expression 2 will also be. In other words, the higher $V_{SH}$ is, the longer the flight path (represented by "r") is likely to be.

Detailed mathematical modeling of air transition can be difficult due to a number of factors that are not trivial to evaluate, such as variable ground effect, transient aerodynamics and the effect of piloting technique. Therefore, segment d2 is usually calculated by using simplified parametric models entirely based on flight test data.

Classically, the approved length of segment d2 is based on operational procedures that demand the airplane to rotate to a given pitch attitude (θ) at a given speed ($V_R$) and with a given pitch rate (q). In both flight testing and daily operation, these parameters (θ, q and $V_R$,) are subjected to a series of constraints, for example:

Pitch Angle (θ):
  Can be limited by the airplane capacity to achieve the minimum gradients of the applicable certification requirements with one engine made inoperative, in any condition within the operational envelope of the aircraft
  By geometrical limitations, in order to avoid tail strikes during takeoff Pitch Rate (q):
Low pitch rates lead to longer takeoff distances
Excessively high rates introduce the risk of overshooting the defined takeoff θ, and may increase the risk of tail strikes Rotation Speed ($V_R$):
  $V_R$ is constrained by requirements that relate it to the typical takeoff speeds (for Part-23 and Part-25 certifiable airplanes, $V_1$, $V_{LOF}$ and $V_2$)
  $V_R$ shall be such that, after rotation, the airplane will accelerate to a given speed before reaching a given height ($V_2$ at 35 ft for airplanes certifiable under Part-23 and Part-25 of Title 14 of the regulations of the Federal Aviation Administration, incorporated herein by reference), while achieving the minimum climb gradients required during takeoff.

In order to comply with all the applicable requirements while not demanding exceptional skill from the pilot, aircraft manufacturers will usually define a fixed takeoff pitch for each takeoff configuration, to be commanded at $V_R$ with a given rotation rate.

When performing flight tests for determining the nominal aircraft takeoff distance, manufacturers may follow these procedures, so that the measured performance can be reproduced in actual operation. In addition to the aforementioned limitations, a reasonable amount of data dispersion is introduced into performance models during flight tests due to natural differences in piloting actions, from pilot to pilot. As a result, the aircraft short-field performance can be severely affected by these operational constraints, leading to a non-optimal takeoff distance calculation model.

Another aspect of current practices is that the takeoff attitude is generally defined to satisfy the climb gradient requirements for the most unfavorable condition within the aircraft operation and loading envelopes.

The climb gradient γ is defined as follows:

$$\gamma = \frac{T-D}{W} - \phi \quad [2]$$

In the equation above, T is the net engines thrust, D is the airplane drag in the specified configuration, W is the airplane weight and φ is the runway slope. Conditions for calculation of T and D are defined in the applicable Part-23 and Part-25 certification requirements mentioned above, and incorporated herein by reference.

However, most times (and especially in short airfields) the actual condition is such that, with the defined pitch, the actual climb gradients achievable are much higher than required (there is a so called "energy excess"), resulting in great acceleration at expense of a shallow takeoff flight path. This leads to time increase from rotation to the end of air segment, and consequently produces a longer d2. The following examples illustrate these effects.

EXAMPLE 1

Geometrically-Limited Aircraft

For a given aircraft, a study on the aerodynamics, thrust, weight and operational envelope characteristics shows that the best pitch angle to reach during takeoff is 12°. However, the aircraft has a long tail section and consequently, the maximum rotation angle is limited to 10° in order to avoid tail strikes.

This geometric limit applies while the shock absorbers are compressed by the airplane weight. However, when the airplane rotates after takeoff ground run and assumes an angle of attack, aerodynamic lift is generated and this constraint is quickly relieved. For example, the pitch and clearance profile can be found as shown in FIG. 2.

EXAMPLE 2

Non Geometrically-Limited Airplane

For a given Part-25 certified, non geometrically-limited twin-engine turbofan airplane, a takeoff pitch angle of 11° grants that the minimum gradients required by 25.121(a) and (b) are satisfied at the specified speed in the critical condition (zero and 2.4%, respectively). However, if the airplane is dispatched for takeoff in a short airfield at sea level, in ISA temperature, the takeoff weight is likely to be limited by the available TOD rather than by gradients. As a consequence, the true takeoff gradients to be achieved will be much higher than those of 25.121. In such scenario, the example typical pitch profile shown in FIG. 3 applies.

In both cases, the aircraft will be allowed to accelerate during the air transition, and will reach the end of takeoff with higher final speed. In other words, most of the excess energy provided by the engines during air transition (eq. 1, expression 2) will be converted into kinetic energy (eq. 1, expression 3) instead of potential gravitational energy (eq. 1, expression 4). FIG. 4 illustrates both examples.

The Climb-Optimized Takeoff System is an aircraft functionality aimed at improving the takeoff performance. The improvement is obtained by allowing the airplane to rotate to an optimized pitch attitude at and after $V_R$, while ensuring that the minimum required takeoff climb gradients and the geometric limitations of the airplane are being respected. The optimum takeoff performance is obtained by granting that the airplane pitch attitude, instead of being limited by a single takeoff constraint (such as a given pitch to avoid tail strike) is being tracked to its instantaneous, most constraining limit during the air transition phase (d2).

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 1 is an example takeoff segments definition;

FIG. 2 shows example pitch and clearance time history for a geometrically-limited airplane;

FIG. 3 shows example pitch and clearance time history for a non geometrically-limited airplane;

FIG. 4 shows example increase in air transition distance due to non-optimized pitch;

FIG. 5 shows example auto Takeoff (Climb-Optimized Takeoff) System Diagram;

FIG. 5A shows example pitch and clearance time history an optimized takeoff performance;

FIG. 5B shows an example flow chart performed automatically by a processor executing instructions stored in a non-transitory storage device;

FIG. 6 shows example pitch and clearance time history for a non geometrically-limited airplane;

FIG. 7 shows example body clearance as a function of takeoff pitch angle and height above the runway;

FIG. 8 shows example tail strike safe takeoff pitch angle as a function of airplane height above runway;

FIG. 9 shows example speed increase ratio as a function of first segment gradient and takeoff pitch angle;

FIG. 10 shows example tail strike safe takeoff pitch angle as a function of airplane height above runway.

DETAILED DESCRIPTION

The example non-limiting system and method provides Climb-Optimized Takeoff aircraft functionality aimed at improving the takeoff performance. Improvement is obtained by allowing the airplane to rotate to an optimized pitch attitude at and after VR, while ensuring that the minimum required takeoff climb gradients and the geometric limitations of the airplane are being respected.

An example non-limiting climb-optimized takeoff system can by implemented with:

1) A specifically designed pitch guidance indication; and

2) A control system feature that automatically commands airplane rotation to an optimized pitch attitude during takeoff (auto-takeoff).

In more detail, FIG. 5 shows an overview of an example non-limiting auto-takeoff system and the interfaces with other aircraft systems. As shown in FIG. 5, an aircraft 100 includes conventional sensors and voting arrays 102 that monitor parameters such as temperature, pressure altitude, speed, height and pitch angle and provide sensed (voted) values to pitch guidance subsystem 104. The sensor/voting array 102 is thus capable of measuring the response of the aircraft to control inputs from flight control system 106 such as elevator position. The pitch guidance subsystem 104 also receives pilot input 108 including $V_R$, weight and N1. Additionally, the pitch guidance subsystem 104 receives landing gear and flap information from a configuration subsystem 110. Pitch guidance subsystem 104 thus obtains information used to calculate $\theta_{TS}$ and $\theta_{GR}$ from aircraft sensors 102 and pilot input 108 devices, while the output of the auto-takeoff system is transmitted to the flight control system 106. For a pitch guidance indication, the pitch target is transmitted also to the aircraft display 112.

Pitch control subsystem receives pitch angle, pitch target and rotation trigger information from pitch guidance subsystem 104. The pitch control subsystem 114 applies the climb-optimized takeoff calculations described above to provide the aircraft with capability to calculate and, with an automatic takeoff option, to follow an optimum takeoff pitch guidance as a function of the actual takeoff radiant (in the conditions considered for dispatch) constrained by the aircraft geometric limitations described above, if applicable (see FIG. 5B). The resulting pitch angle profile is similar to the one shown in FIG. 5A, and the resulting flight path from rotation to SH is similar to what is shown in FIG. 6.

The optimum takeoff performance is obtained by granting that the airplane pitch attitude, instead of being limited by a single takeoff constraint (such as a given pitch to avoid tail strike) is being tracked to its instantaneous, most constraining limit during the air transition phase (d2). FIG. 5A illustrates this behavior.

The resulting flight path is illustrated in FIG. 6 and compared to a non-optimized flight path that would be obtained with a traditional single-pitch takeoff.

In the example non-limiting system and method, body clearance before tail strike is a function of airplane tail section geometry and pitch angle, and is scheduled against the airplane height above the runway as shown in FIG. 7.

The target of the functionality is to maximize pitch while retaining a safe takeoff clearance margin (dashed line in FIG. 7). Therefore, the takeoff pitch limit to avoid tail strikes ($\theta_{TS}$) is scheduled as a function of the airplane height above runway as shown in FIG. 8.

For rotation to a given takeoff pitch angle, speed ratio increase from lift off to the screen height is a function of the first segment gradient (defined as per equation 2). Conversely, for a given gradient, this speed ratio is a function of the pitch angle. The speed ratio is defined by equation [3] below:

$$\frac{dV}{V} = \frac{V_{SH} - V_{LO}}{V_S} \quad [3]$$

To improve the engines excess power conversion into potential energy (i.e. height), the pitch for takeoff is calculated as a function of the first-segment gradient for the specific takeoff condition, in order to reach a specific speed increase ratio (dashed line in FIG. 9). The result is a gradient-optimized pitch schedule as shown in FIG. 10.

The final, optimized takeoff pitch is obtained by the following expression:

$$\theta_{TO} = \text{minimum}(\theta_{TS}; \theta_{GR}) \quad [4]$$

Given that $\theta_{TS}$ is dependent on the airplane height above ground, equation [4] is continuously evaluated during the takeoff run, and will result in a variable pitch target to be followed at and after takeoff rotation.

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

We claim:

1. A climb-optimized automatic takeoff system for an aircraft comprising:
    sensors disposed on the aircraft, said sensors being configured to detect aircraft flight conditions;
    at least one processor disposed on said aircraft and operatively connected to said sensors, said processor automatically measuring instantaneous airplane pitch attitude;
    a flight management computer that controls an aerodynamic control surface responsible for pitch control, namely an elevators of said aircraft to allow the aircraft to rotate to an optimized pitch attitude at and after the takeoff rotation speed $V_R$ while ensuring that the minimum required takeoff climb gradients γ and the geometric limitations of the aircraft are being respected;
    wherein climb gradient is given by:

$$\gamma = \frac{T-D}{W} - \phi;$$

and
    a flight control law which allows the said flight management computer to control the elevator according to an optimized elevator deflection, thus yielding the optimized pitch attitude at and after the takeoff rotation speed $V_R$ while ensuring that the minimum required takeoff climb gradient (γ) as well as guaranteeing that all aircraft limitations are respected, wherein the optimized pitch attitude is continually evaluated to automatically follow a variable pitch target at and after takeoff rotation.

2. The system of claim 1 wherein said processor continuously evaluates parameters measured by the sensors and using its internal control law determines, automatically, an optimized attitude (theta) target to be followed at and after the takeoff rotation, up to level flight, providing the elevator with the optimized deflection automatically without the need of pilot intervention; and
    measures, calculates and acts solely based on its internal logic and is independent of pilot control input.

3. The system of claim 2 wherein said processor is configured to evaluate a speed ratio increase from lift off to screen height in accordance with $$\frac{dV}{V} = \frac{V_{SH} - V_{LO}}{V_S}.$$

4. The system of claim 1 wherein said flight management computer maximizes pitch while retaining a safe takeoff clearance margin to avoid tail strikes by scheduling takeoff pitch limit as a function of the airplane height above runway.

5. The system of claim 1 wherein said processor is configured to use its internal control law and implemented logics to derive a pitch schedule which optimizes climb gradient, thus optimizing the conversion of the excess energy into potential energy, yield a faster aircraft climb.

6. A method of an automatic hands-free aircraft takeoff comprising:
    accelerating the aircraft down a runway;
    during said acceleration, using at least one sensor to determine pitch angle, pitch target and rotation trigger information;
    automatically, with at least one processor, performing climb-optimized takeoff calculations to provide the aircraft with capability to follow a takeoff pitch guidance at and after takeoff rotation speed $V_R$ as a function of actual takeoff gradient constrained by aircraft geometric limitations thereby intelligently varying aircraft pitch during takeoff in the transition phase from ground to air, wherein following the takeoff pitch guidance includes continually evaluating an optimized pitch attitude to automatically follow a variable pitch target at and after takeoff rotation.

7. A non-transitory storage medium storing instructions for automatic execution by at least one processor, said instructions being configured to:
   automatically accelerate the aircraft down a runway;
   during said acceleration, using at least one sensor to determine pitch angle, pitch target and rotation trigger information;
   automatically and autonomously, with at least one processor, performing climb-optimized takeoff calculations to provide the aircraft with capability to follow a takeoff pitch guidance at and after takeoff rotation speed $V_R$ as a function of actual takeoff gradient, without pilot intervention, constrained by aircraft geometric limitations thereby intelligently varying aircraft pitch during takeoff in the transition phase from ground to air and during initial climb, wherein the climb-optimized takeoff calculations comprise continually evaluating the aircraft pitch to automatically follow a variable pitch target at and after takeoff rotation.

* * * * *